(12) United States Patent
Terazawa et al.

(10) Patent No.: US 11,178,013 B2
(45) Date of Patent: Nov. 16, 2021

(54) NETWORK MONITOR, NETWORK MONITORING METHOD, AND RECORDING MEDIUM STORING PROGRAM

(71) Applicant: Panasonic Intellectual Property Corporation of America, Torrance, CA (US)

(72) Inventors: Hiroyasu Terazawa, Osaka (JP); Tomoyuki Haga, Nara (JP); Yuishi Torisaki, Osaka (JP); Ryo Kato, Osaka (JP); Yoshihiro Ujiie, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 130 days.

(21) Appl. No.: 16/734,439

(22) Filed: Jan. 6, 2020

(65) Prior Publication Data
US 2020/0145293 A1 May 7, 2020

Related U.S. Application Data

(63) Continuation of application No. PCT/JP2018/027013, filed on Jul. 19, 2018, which is a continuation of application No. PCT/JP2017/027122, filed on Jul. 26, 2017.

(51) Int. Cl.
*H04L 12/24* (2006.01)
*H04W 4/48* (2018.01)
*H04L 12/911* (2013.01)

(52) U.S. Cl.
CPC ...... *H04L 41/0896* (2013.01); *H04L 41/5054* (2013.01); *H04L 47/72* (2013.01); *H04L 47/748* (2013.01); *H04W 4/48* (2018.02)

(58) Field of Classification Search
CPC . H04L 41/0896; H04L 41/5054; H04L 47/72; H04L 47/748; H04W 4/48
(Continued)

(56) References Cited

U.S. PATENT DOCUMENTS

| 7,586,946 B2 * | 9/2009 | Pomaranski ...... H04L 47/781 370/468 |
| 2007/0121539 A1 * | 5/2007 | Kikuchi ............ H04M 15/81 370/328 |

(Continued)

FOREIGN PATENT DOCUMENTS

| EP | 2675132 A1 | 12/2013 |
| JP | 2013-258700 | 12/2013 |

(Continued)

OTHER PUBLICATIONS

International Search Report of PCT application No. PCT/JP2017/027122 dated Oct. 24, 2017.
(Continued)

*Primary Examiner* — Obaidul Huq
(74) *Attorney, Agent, or Firm* — Greenblum & Bernstein, P.L.C.

(57) ABSTRACT

Provided is a network monitor for a mobility network used in a mobility entity. The mobility network is formed of a source unit, a destination unit, and one or more repeaters. Each repeater includes a network monitor that receives, from the source unit, an announcement for a bandwidth reservation. The announcement includes a value of a first bandwidth requirement for the source unit to perform first data communication. The network monitor further determines a determination result of whether to reserve the first bandwidth by comparing the value of the first bandwidth with a range of values of a second bandwidth for the first data communication specified in a white list stored in a database. The network monitor reserves the first bandwidth for performing (Continued)

the first data communication depending on the determination result, and transmits, to the source unit, a reservation status of the first bandwidth.

14 Claims, 5 Drawing Sheets

(58) Field of Classification Search
USPC .................................................. 370/229, 230
See application file for complete search history.

(56) References Cited

U.S. PATENT DOCUMENTS

2010/0074107 A1* 3/2010 Tyagi ................. H04L 47/2433
370/229

2010/0284423 A1 11/2010 Yokotani et al.
2011/0222409 A1* 9/2011 Sun ................... H04W 72/1215
370/241
2013/0339537 A1 12/2013 Joy et al.

FOREIGN PATENT DOCUMENTS

| JP | 2016-019031 | 2/2016 |
| WO | 2009/093322 | 7/2009 |

OTHER PUBLICATIONS

International Search Report of PCT application No. PCT/JP2018/027013 dated Oct. 9, 2018.
The Extended European Search Report dated Jul. 9, 2020 for European Patent Application No. 18838224.6.

* cited by examiner

| TYPE OF DATA COMMUNICATION | NORMAL BAND VALUE | ABNORMALITY JUDGEMENT VALUE |
|---|---|---|
| REAR-CAMERA VIDEO | 5 Mbps | ±1 Mbps |
| LIDAR SIGNAL | 2 Mbps | ±0.5 Mbps |
| REMOTE CONTROL DATA | 1 Mbps | ±0.1 Mbps |

| TYPE OF DATA COMMUNICATION | MAXIMUM NUMBER OF TIMES |
|---|---|
| REAR-CAMERA VIDEO | 1/min |
| LIDAR SIGNAL | 5/min |
| REMOTE CONTROL DATA | 10/min |
| Total | 20/min |

NETWORK MONITOR, NETWORK MONITORING METHOD, AND RECORDING MEDIUM STORING PROGRAM

BACKGROUND

1. Technical Field

The present disclosure relates to network monitors, network monitoring methods, and recording media storing programs for mobility networks.

2. Description of the Related Art

Systems in automobiles nowadays have a large number of devices called electronic control units (hereinafter referred to as ECUs). The network that interconnects these ECUs is called the in-vehicle network. There are a large number of standards for the in-vehicle network, among which a standard called CAN (Controller Area Network (registered trademark)) is generally used. Note that the communication speed of CAN is low, which is about 1 Mbps maximum.

Meanwhile, it is expected that the number of ECUs used in the in-vehicle network will further increase for realization of fully automated driving. In light of this, it can be said that CAN has a limitation because its communication speed is low. Thus, to increase the communication speed of the in-vehicle network, there is a move afoot to apply Ethernet (registered trademark), the performance of which has been proved as a general information network, typically on the Internet, to the in-vehicle network. Since Ethernet (registered trademark) has a communication speed of 100 Mbps which is 100 times that of CAN, it is expected to be a technology replacing CAN. Here, Ethernet (registered trademark) has problems to be solved, in other words, weak points, in terms of real-time communication and safety of the communication in order to use it in the in-vehicle network.

To compensate for the weak points of Ethernet (registered trademark), proposed is Ethernet AVB/TSN (audio video bridging/time sensitive networking) having enhanced functions for time synchronization, a bandwidth guarantee, and a delay guarantee. Since an enormous amount of data is handled in fully automated driving, the in-vehicle network must be able to process a large volume of data, such as data from various sensors and video data, simultaneously and parallelly. Since Ethernet AVB/TSN is capable of processing a large volume of data simultaneously and parallelly, it is effective for the use.

However, even for an in-vehicle network using Ethernet AVB/TSN, if data is handled inappropriately, it may impede fully automated driving, leading to a serious accident.

To address this, for example, Japanese Unexamined Patent Application Publication No. 2016-19031 (hereinafter referred to as Patent Literature 1) discloses a technique for detecting inappropriate data in Ethernet AVB/TSN. In the technique disclosed in Patent Literature 1, a table is prepared in advance, having stream IDs included in IEEE1722 frames used in Ethernet AVB/TSN and the MAC addresses of the source units corresponding to the stream IDs. Then, the MAC address extracted from the stream ID included in a frame actually transmitted or received is compared with the one in the table to detect inappropriate data.

SUMMARY

The technique in Patent Literature 1 is capable of detecting inappropriate data on a frame basis but, unfortunately, incapable of detecting whether the bandwidth, which is a network bandwidth necessary for transmitting and receiving data, is appropriately reserved. Therefore, if a service reserves and uses an inappropriately large bandwidth for data communication via the in-vehicle network, the in-vehicle network will be occupied inappropriately, resulting in a problem that other services cannot communicate. This situation will occur not only in mobility networks in automobiles but also those in construction machines, agricultural machines, ships, trains, airplanes, and the like.

The present disclosure has been made in light of the above situation, and thus, one non-limiting and exemplary embodiment provides a network monitor and the like capable of determining whether the reservation of a bandwidth in a communication path of a mobility network is inappropriate.

In one general aspect, the techniques disclosed here feature a network monitor for a mobility network used in a mobility entity, the mobility network being formed by multiple electronic control units including a source unit, a destination unit, and one or more repeaters that form a communication path in the mobility network, each of the one or more repeaters including the network monitor, the network monitor comprising: a processor; and a memory including at least one set of instructions that, when executed by the processor, causes the processor to perform operations including: receiving, from the source unit, an announcement for a bandwidth reservation, the announcement including a value of a first bandwidth requirement for the source unit to perform first data communication; determining a determination result of whether to reserve the first bandwidth by comparing the value of the first bandwidth with a range of values of a second bandwidth for the first data communication specified in a white list, the white list being stored in a database and the range of values of the second bandwidth is specified according to a data communication type; reserving the first bandwidth for performing the first data communication depending on the determination result; and transmitting, to the source unit, a reservation status of the first bandwidth.

It should be noted that these general or specific aspects may be implemented as a system, a method, an integrated circuit, a computer program, or a computer readable recording medium such as CD-ROM, or may be implemented as any selective combination thereof.

The network monitor and the like according to the present disclosure is capable of determining whether the reservation of a bandwidth in a communication path of a mobility network is inappropriate.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

A network monitor according to an aspect of the present disclosure is a network monitor for a mobility network used in a mobility entity, the mobility network being formed by multiple electronic control units including a source unit, a destination unit, and one or more repeaters that form a communication path in the mobility network, each of the one or more repeaters including the network monitor, the network monitor comprising: a processor; and a memory including at least one set of instructions that, when executed by the processor, causes the processor to perform operations including: receiving, from the source unit, an announcement for a bandwidth reservation, the announcement including a value of a first bandwidth requirement for the source unit to perform first data communication; determining a determination result of whether to reserve the first bandwidth by comparing the value of the first bandwidth with a range of values of a second bandwidth for the first data communication specified in a white list, the white list being stored in a database and the range of values of the second bandwidth is specified according to a data communication type; reserving the first bandwidth for performing the first data communication depending on the determination result; and transmitting, to the source unit, a reservation status of the first bandwidth.

Here, for example, the white list includes a parameter according to the data communication type. The white list further indicates a normal band value and an abnormality judgment value that specify deviations from the normal band value, which provide the range of values of the second bandwidth.

In addition, for example, the determining may include comparing the value of the first bandwidth with the parameter included in the white list, and determining whether to reserve the first bandwidth depending on whether the value of the first bandwidth is included in the range of values of the second bandwidth specified by the normal band value and the abnormality judgment value.

Here, for example, the determining may include storing data, in a memory as a long of the determination result, indicating whether the value of the first bandwidth is included in the range of values of the second bandwidth specified by the normal band value and the abnormality judgment value.

In addition, for example, when the value of the first bandwidth is determined to be included in the range of values of the second bandwidth specified by the normal band value and the abnormality judgment value, the first bandwidth may be reserved for performing the first data communication in the reserving.

In addition, for example, when the value of the first bandwidth is determined to be out of the range of values of the second bandwidth specified by the normal band value and the abnormality judgment value, the operation in the reserving may be such that the first bandwidth is not reserved.

In addition, for example, the determining may further include determining an operating state of the mobility entity, the determination result may include the operating state of the mobility entity, and when the operating state of the mobility entity is a driving state, the first bandwidth may be reserved in the reserving even if the value of the first bandwidth is determined to be out of the range of values of the second bandwidth specified by the normal band value and the abnormality judgment value.

In addition, for example, the determining may further include determining an operating state of the mobility entity, and when the value of the first bandwidth is determined to be out of the range of values of the second bandwidth specified by the normal band value and the abnormality judgment value, and that the operating state of the mobility entity is determined to be a driving state, the network monitor may transmit, to the mobility entity, an instruction to slow down and then stop the mobility entity.

In addition, for example, the determining may further include determining an operating state of the mobility entity, and when the value of the first bandwidth is determined to be out of the range of values of the second bandwidth specified by the normal band value and the abnormality judgment value, and that the operating state of the mobility entity is determined to be a state where an automated driving function or a driving assistance function is in operation, the network monitor may transmit, to the mobility entity, an instruction to stop the automated driving function or to stop the driving assistance function.

In addition, for example, the transmitting may include transmitting the determination result in the determining to the source unit.

In addition, for example, when the first bandwidth is determined to be reserved, the network monitor may forward the value of the first bandwidth to a next repeater on the communication path or the destination unit.

Here, for example, the first bandwidth may be reserved via Ethernet AVB/TSN.

Each embodiment described below illustrates a specific example of the present disclosure. Numeral values, shapes, constituents, steps, the order of steps, and the like shown in the following embodiment are examples and not intended to limit the present disclosure. Among the constituents in the following embodiments, the constituents not stated in independent claims indicating the highest concept are described as optional constituents. In addition, any combination of elements from all the embodiments may be formed.

Embodiment

Hereinafter, with reference to the drawings, description is provided for a network monitor and the like in an embodiment.

[Overall Configuration of In-Vehicle Network]

Figure 1:
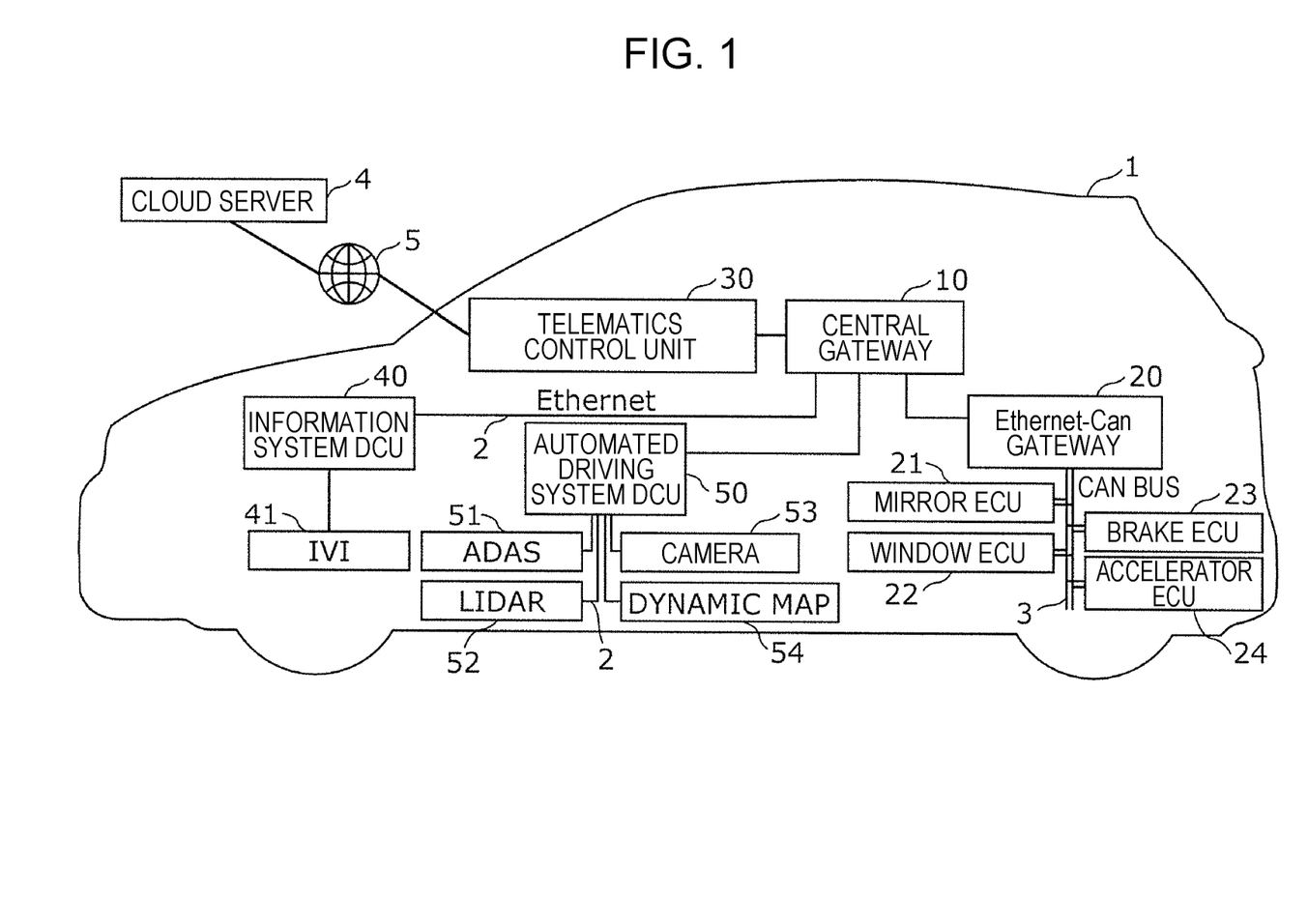
FIG. 1 is a diagram illustrating an example of the overall configuration of an in-vehicle network according to an embodiment.

FIG. 1 is a diagram illustrating an example of the overall configuration of an in-vehicle network according to the present embodiment.

The in-vehicle network illustrated in FIG. 1 has multiple electronic control units (ECUs) and is mounted on a vehicle 1. In the example illustrated in FIG. 1, the in-vehicle network in the vehicle 1 is constituted of, for example, an Ethernet 2 and a CAN bus 3. Note that the in-vehicle network in the vehicle 1 may be constituted of only the Ethernet 2.

To a central gateway 10 is connected an Ethernet-CAN gateway 20, telematics control unit 30, information system DCU (domain control unit) 40, and automated driving system DCU 50, using the Ethernet 2. In the present embodiment, the central gateway 10 in the present embodiment corresponds to an ECU.

The telematics control unit 30 is a unit for the vehicle 1 to communicate with a cloud server 4 in an external network 5. The telematics control unit 30 performs wireless communication, for example, a mobile entity phone network, Wi-Fi (registered trademark), or the like.

The information system DCU 40 is connected to an IVI (In-vehicle Infotainment) 41 with the Ethernet 2 and performs domain management of the information system network. In the present embodiment, the information system DCU 40 corresponds to an ECU.

The automated driving system DCU 50 is connected to an ADAS (advanced driver-assistance systems) 51, LIDAR 52, camera 53, and DYNAMIC MAP 54, using the Ethernet 2. In the present embodiment, the automated driving system DCU 50 corresponds to an ECU. The ADAS 51 is a system that detects the possibility of an accident in advance to avoid the accident. The LIDAR 52 is for sensing obstacles outside the vehicle. The camera 53 captures images of the situation outside the vehicle, and the DYNAMIC MAP 54 receives and controls a dynamic map.

The Ethernet-CAN gateway 20 is disposed at a relay point between the Ethernet 2 and the CAN bus 3. The Ethernet-CAN gateway 20 is provided with the CAN bus to which a mirror ECU 21, window ECU 22, brake ECU 23, and accelerator ECU 24 are connected. The mirror ECU 21 controls opening and closing of mirrors in the vehicle 1. The window ECU 22 controls opening and closing of windows in the vehicle 1. The brake ECU 23 controls the braking operation of the vehicle 1. The accelerator ECU 24 controls the speed of the vehicle 1.

[Network Monitor]

Figure 2:
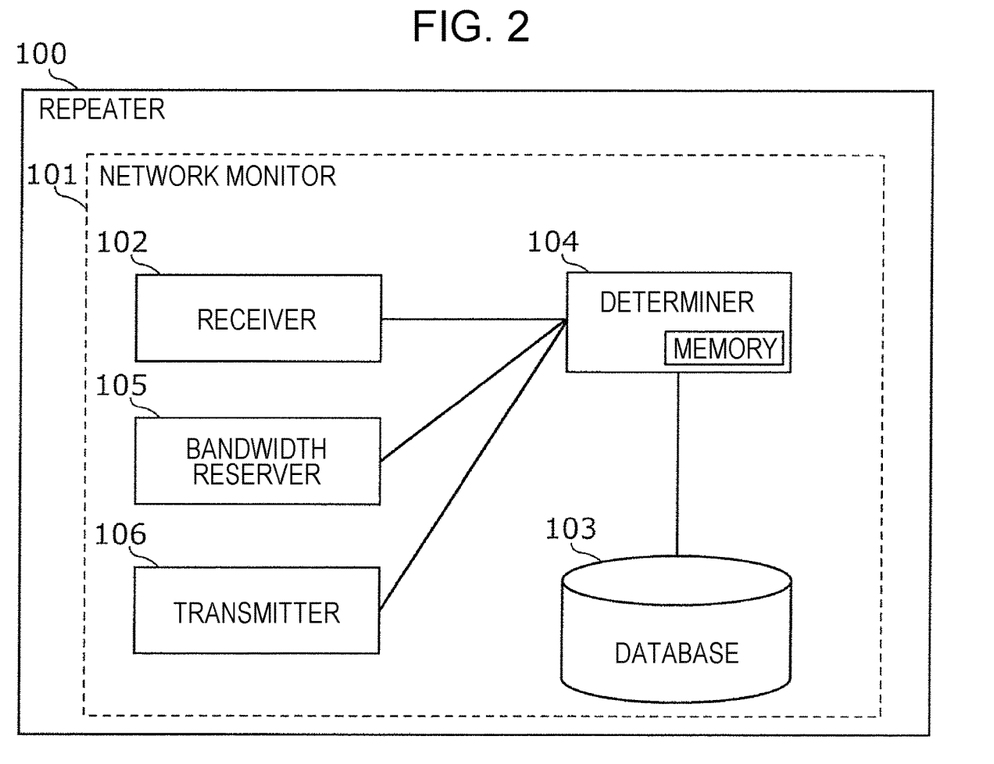
FIG. 2 is a diagram illustrating an example of the configuration of a network monitor according to the embodiment.

FIG. 2 is a diagram illustrating an example of the configuration of a network monitor 101 according to the present embodiment.

The network monitor 101 is an example of a network monitor in the in-vehicle network of the vehicle 1. Among a source unit, a destination unit, and one or more repeaters that form a communication path in the in-vehicle network of the vehicle 1, each of which corresponding to one of the multiple ECUs, the network monitor 101 is included in each of the one or more repeaters. In other words, the network monitor 101 is implemented inside the repeater 100 as illustrated in FIG. 2.

The repeater 100 is one of the ECUs constituting the in-vehicle network and relays Ethernet frames of Ethernet AVB/TSN flowing in the communication path formed by the ECUs that constitute the in-vehicle network. Ethernet AVB/TSN is a standard for interconnecting multimedia devices and/or computers using an Ethernet network. This standard enables time synchronization, a bandwidth guarantee and a delay guarantee, which are weak points of Ethernet (registered trademark). Although in the present embodiment, description is provided below for the case of using a protocol in IEEE802.1Qat that in which a bandwidth necessary for the stream is reserved in advance to guarantee the bandwidth, as a mechanism to reserve a bandwidth for use, the present disclosure is not limited to this mechanism. Examples of bandwidth reservation mechanisms include a mechanism in Ethernet AVB/TSN and mechanisms specified in other standards or the like.

The network monitor 101 has a receiver 102, database 103, determiner 104, bandwidth reserver 105, and transmitter 106, as illustrated in FIG. 2, <Receiver 102>

The receiver 102 receives an announcement transmitted by the source unit using the mechanism for bandwidth reservation and including the value of a first bandwidth for the source unit to perform first data communication. The value of the first bandwidth included in the announcement is the value of the bandwidth that the source unit wants to reserve to perform a service.

Note that in the communication path described above, the source unit corresponds to the "talker" in the IEEE802.1Qat protocol, and transmitting an announcement corresponds to "advertise" in the IEEE802.1Qat protocol. The destination unit corresponds to the "listener" in the IEEE802.1Qat protocol.

<Database 103>

The database 103 holds a white list that specifies a second bandwidth on a data communication type basis. Here, the white list includes parameters indicating a normal band value and an abnormality judgment value that specify the second bandwidth on a data communication type basis. The type of data communication indicates data that a service uses, for example, rear-camera video, a LIDAR signal, and remote-control data. The normal band value is a value of the bandwidth in normal use used by a service in the in-vehicle network, and thus the normal band value may be referred to as the second bandwidth. The abnormality judgment value is a value indicating the range of variation in a bandwidth in normal use used by a service in the in-vehicle network. In the present embodiment, the value obtained by combining the normal band value and the abnormality judgment value together is described as the second bandwidth.

Figure 3:
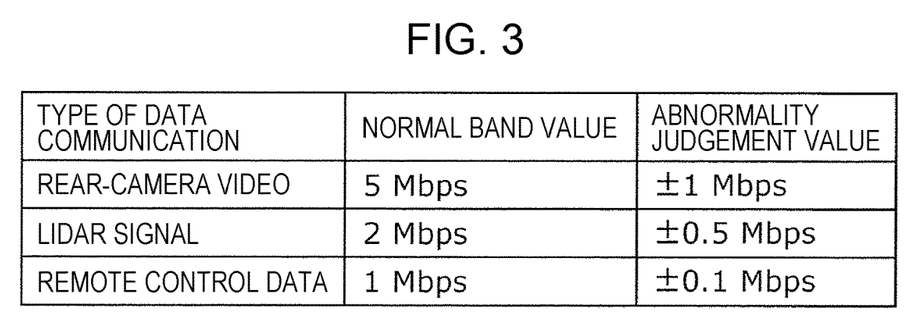
FIG. 3 is a diagram illustrating an example of a white list which a database according to the embodiment holds.

FIG. 3 is a diagram illustrating an example of a white list that the database 103 according to the present embodiment holds.

The white list illustrated in FIG. 3 is constituted of parameters indicating the normal band value and the abnormality judgment value on a data communication type basis and thus specifies the second bandwidth. The white list illustrated in FIG. 3 shows the types of data communication used in the network by three types of services as an example of types of data communication, such as rear-camera video, a LIDAR signal, and remote-control data.

More specifically, in the example illustrated in FIG. 3, the types of data communication used by the services are rear-camera video, a LIDAR signal, and remote-control data. For the rear-camera video, the normal band value is 5 Mbps (megabits per second), and the range of the normal band value is a range of plus and minus 1 Mbps relative to the normal band value (specifically, 4 Mbps to 6 Mbps). For the LIDAR signal, the normal band value is 2 Mbps, and the range of the normal band value is a range of plus and minus 0.5 Mbps relative to the normal band value. For the remote-control data, the normal band value is 1 Mbps, and the range of the normal band value is a range of plus and minus 0.1 Mbps relative to the normal band value.

Note that the unit of the normal band value and the abnormality judgment value is not limited to that illustrated in FIG. 3. Besides bps, pps (packets per second) may be used, or units for various performance indicators for a network, such as the number of flows may also be used.

<Determiner 104>

The determiner 104 compares the value of the first bandwidth with the second bandwidth of the first data communication specified in the white list to determine whether to reserve the first bandwidth.

For example, the determiner 104 may compare the value of the first bandwidth with parameters included in the white list and determine whether to reserve the first bandwidth depending on whether the value of the first bandwidth is included in the range of the second bandwidth specified by the normal band value and the abnormality judgment value.

In addition, for example, when the determiner 104 determines that the first bandwidth is to be reserved, the determiner 104 may forward the value of the first bandwidth to the next repeater on the communication path or the destination unit.

Note that the determiner 104 may store in a storage the data indicating whether the value of the first bandwidth is included in the range of the second bandwidth specified by the normal band value and the abnormality judgment value, as a log of the determination result. Although here, the storage is a memory or the like included in the determiner 104, the storage may be a memory or the like included in the network monitor 101.

In the present embodiment, the determiner 104 compares the value of the first bandwidth included in the announcement received by the receiver 102 with the white list which the database 103 holds, and notifies the transmitter 106 of the determination result, which is the comparison result. For example, if the first bandwidth is out of the range of the second bandwidth specified by the normal band value and the abnormality judgment value, the determiner 104 notifies the transmitter 106 of the determination result indicating it. On the other hand, for example, if the first bandwidth is within the range of the second bandwidth specified by the normal band value and the abnormality judgment value, the determiner 104 notifies the transmitter 106 of the determination result indicating it and notifies the bandwidth reserver 105 of the value of the first bandwidth. Then, the determiner 104 also forwards the announcement to the next repeater on the communication path. Note that if there is not a next repeater on the communication path but the next is the destination unit, the determiner 104 forwards the announcement to the destination unit.

<Bandwidth Reserver 105>

The bandwidth reserver 105 reserves the first bandwidth according to the determination result of the determiner 104. For example, if the determiner 104 determines that the value of the first bandwidth is included in the range of the second bandwidth specified by the normal band value and the abnormality judgment value, the bandwidth reserver 105 reserves the first bandwidth. On the other hand, for example, if the determiner 104 determines that the value of the first bandwidth is out of the range of the second bandwidth specified by the normal band value and the abnormality judgment value, the bandwidth reserver 105 does not have to reserve the first bandwidth.

As described above, the bandwidth reserver 105 reserves a bandwidth on the communication path of the in-vehicle network according to the determination result reported by the determiner 104.

<Transmitter 106>

The transmitter 106 transmits the determination result of the determiner 104. More specifically, the transmitter 106 transmits the determination result of the determiner 104 to the source unit.

[Configuration Example of Communication Path]

Figure 4:
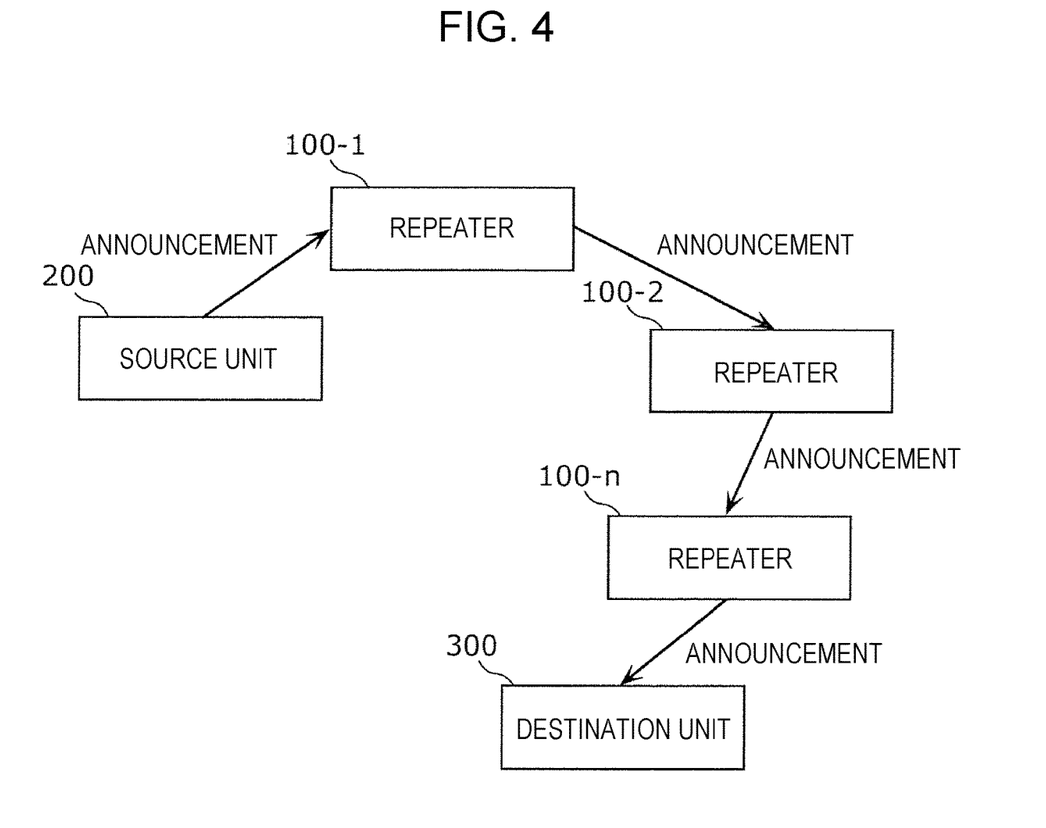
FIG. 4 is a diagram illustrating an example of the configuration of a communication path of the in-vehicle network according to the embodiment.

FIG. 4 is a diagram illustrating an example of the configuration of a communication path of the in-vehicle network according to the present embodiment.

FIG. 4 illustrates an example of the configuration of a communication path connecting a source unit 200 to a destination unit 300 in an in-vehicle network of the vehicle 1. The communication path in FIG. 4 illustrates an example in which the source unit 200 is connected to the destination unit 300 via n repeaters (n is a natural number larger than or equal to one). Note that the communication path in the in-vehicle network of the vehicle 1 may be simply referred to as the network. Each of the source unit 200, the destination unit 300, and the repeaters 100-1 to 100-n is one of the ECUs included in the in-vehicle network of the vehicle 1. Each of the repeaters 100-1 to 100-n includes the network monitor 101 described above thereinside.

It is assumed that to perform a service, the source unit 200 wants to reserve a necessary first bandwidth on the communication path illustrated in FIG. 4. In this case, the source unit 200 transmits an announcement including the value of the first bandwidth to the repeater 100-1, which is connected next to the source unit 200 itself.

Then, the repeater 100-1 performs, using the network monitor 101 included therein, a first bandwidth reservation determination to determine whether to reserve the first bandwidth depending on whether the first bandwidth is inappropriate. If the repeater 100-1 has reserved the first bandwidth properly, the repeater 100-1 forwards, in other words, transmits the announcement including the value of the first bandwidth to the next repeater 100-2.

In the same manner, the repeater 100-2 performs, using the network monitor 101 included therein, performs the first bandwidth reservation determination. If the repeater 100-2 has reserved the first bandwidth properly, it transmits the announcement including the value of the first bandwidth to the next repeater 100-3.

In summary, each of the repeaters 100-1 to 100-(N-1) performs, using the network monitor 101 included therein, the first bandwidth reservation determination. If the repeater has reserved the first bandwidth properly, it transmits the announcement including the value of the first bandwidth to the next repeater. The repeater 100-N repeats the operation of performing the first bandwidth reservation determination using the network monitor 101 included therein and transmitting, if the repeater 100-N has reserved the first bandwidth properly, the announcement including the value of the first bandwidth to the destination unit 300.

Note that although in FIG. 4, the repeater 100-2 is connected to the repeater 100-N to simplify the figure, multiple repeaters may be connected between the repeater 100-2 and the repeater 100-N.

The first bandwidth from the source unit 200 to the destination unit 300 is reserved in the communication path illustrated in FIG. 4 by transmitting the announcement including the value of the first bandwidth from the source unit 200 to the destination unit 300 as described above.

[Operation of Network Monitor 101 and Others]

Description is provided below for the operation of the network monitor 101 configured as above.

Figure 5:
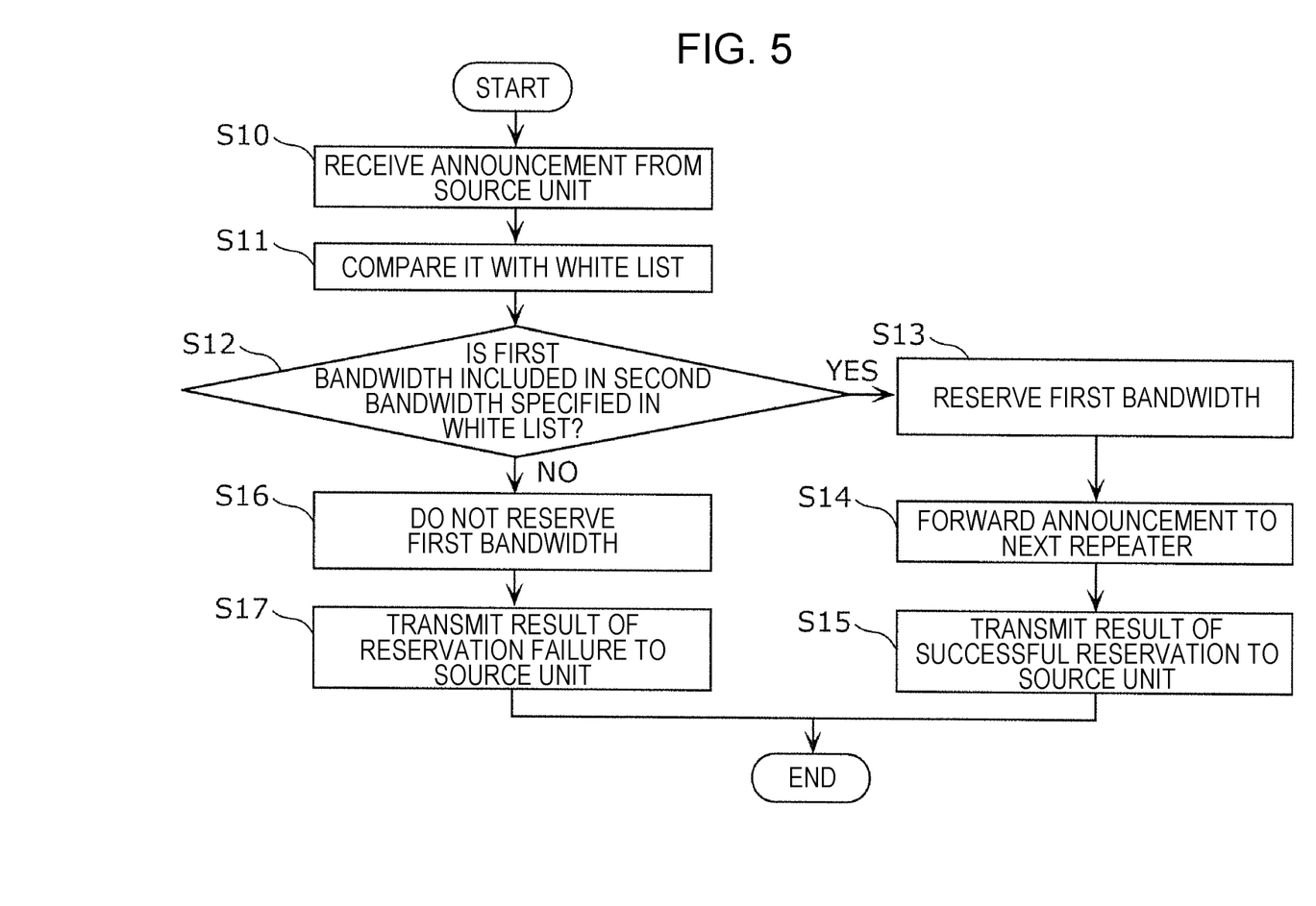
FIG. 5 is a flowchart illustrating processes performed by the network monitor according to the embodiment.

FIG. 5 is a flowchart illustrating processes performed by the network monitor 101 according to the present embodiment. FIG. 5 illustrates processes from when the network monitor 101 receives an announcement of a first bandwidth from the source unit in the communication path until the network monitor 101 reserves the first bandwidth on the communication path.

First, at step S10, the receiver 102 receives an announcement from the source unit. More specifically, the receiver 102 receives the announcement transmitted by the source unit using a mechanism for bandwidth reservation and including the value of the first bandwidth for the source unit to perform first data communication.

Next, at step S11, the determiner 104 compares the value of the first bandwidth included in the announcement received by the receiver 102 with the white list which the database 103 holds. More specifically, the determiner 104 compares the value of the first bandwidth with the second bandwidth for the first data communication, specified in the white list which the database 103 holds.

Next, at step S12, the determiner 104 determines whether the first bandwidth is included in the second bandwidth specified in the white list. More specifically, the determiner 104 determines whether the value of the first bandwidth is included in the range of the second bandwidth specified by the normal band value and the abnormality judgment value, for example, as illustrated in FIG. 4.

Next, at step S12, if the first bandwidth is within the second bandwidth (YES at S12), the bandwidth reserver 105 reserves the first bandwidth on the communication path (S13). More specifically, if the determiner 104 determines that the value of the first bandwidth is included in the range of the second bandwidth specified by the normal band value and the abnormality judgment value, the bandwidth reserver 105 reserves the first bandwidth.

Next, at step S14, the determiner 104 forwards the announcement to the next repeater. More specifically, since the determiner 104 determined at step S13 that the first bandwidth is to be reserved, the determiner 104 forwards the announcement including the value of the first bandwidth to the next repeater on the communication path.

Next, at step S15, the transmitter 106 transmits to the source unit the result of successful reservation indicating that the first bandwidth has been reserved.

On the other hand, if the first bandwidth is not within the range of the second bandwidth at step S12 (NO at S12), the bandwidth reserver 105 does not reserve the first bandwidth on the communication path (S16).

Next, at step S17, the transmitter 106 transmits to the source unit the result of reservation failure indicating that the first bandwidth has not been reserved.

[Effect and Others]

As described above, the network monitor 101 of the present embodiment or the like compares the value of the first bandwidth required in the announcement from the source unit included in the communication path with the value of the second bandwidth specified in the white list which the database 103 holds. This operation makes it possible to determine whether the reservation of a bandwidth in the communication path of the in-vehicle network is inappropriate.

Since the network monitor 101 of the present embodiment or the like can determine whether the reservation of a bandwidth, which is a band necessary in the communication path of the in-vehicle network, is inappropriate, the network monitor 101 can discard an inappropriate bandwidth request that deviates from a predetermined communication range. This prevents a certain service from reserving an inappropriately large bandwidth, which, in turn, prevents the certain service from occupying the communication band inappropriately and causing a situation where other services cannot communicate.

OTHER MODIFICATION EXAMPLES

Note that although the present disclosure has been described based on the above embodiment, it goes without saying that the present disclosure is not limited to the above embodiment. The following cases are also included in the present disclosure.

(1) Although in the description of the above embodiment, the network monitor 101 is implemented inside a repeater included in the communication path, the present disclosure is not limited to this configuration. The network monitor 101 may be implemented in any device that relays messages in the communication path. For example, the network monitor 101 may be implemented in an Ethernet switch, CGW, domain controller disposed in each domain, conversion apparatus of CAN and Ethernet, or the like.

(2) Although in the description of the above embodiment, the network monitor 101 does not reserve the first bandwidth on the communication path if the first bandwidth is not included in the range of the second bandwidth specified in the white list that the database 103 holds, the present disclosure is not limited to this operation. In other words, although in the above description, the network monitor 101 determines whether to reserve the first bandwidth on the communication path based on the white list that the database 103 holds, the present disclosure is not limited to this operation. The operation may be such that if the first bandwidth is included in the range of the bandwidth specified in a black list that the database 103 holds, the network monitor 101 does not reserve the first bandwidth on the communication path. As in this case, the database 103 may have either the white list or the black list. The database 103 may have both the white list and the black list.

(3) Although in the description of the above embodiment, the network monitor 101 does not reserve the first bandwidth on the communication path if the first bandwidth is not included in the range of the second bandwidth specified by the white list that the database 103 holds, the present disclosure is not limited to this operation.

The operation may be such that even when the first bandwidth is out of the range of the second bandwidth, the network monitor 101 reserves the first bandwidth on the communication path temporarily and stores the determination result indicating that the first bandwidth is out of the range of the second bandwidth. This is because the passengers of the vehicle may be put in a dangerous situation unless the first bandwidth is reserved on the communication path temporarily, depending the operating state of the vehicle having the in-vehicle network including the ECU in which the network monitor 101 is included. Then, after analyzing the log, if it is found that the first bandwidth reserved temporarily is truly inappropriate, the first bandwidth can be, for example, discarded according to the operating state of the vehicle.

In other words, more specifically, the determination result of the determiner 104 may include the operating state of the vehicle 1 by the determiner 104 further determining the operating state of the vehicle 1 in the network monitor 101. Then, even when the determiner 104 determines that the value of the first bandwidth is out of the range of the second bandwidth specified by the normal band value and the abnormality judgment value, the bandwidth reserver 105 may reserve the first bandwidth if the operating state of the vehicle 1 is a driving state. The determination result is stored as a log.

In addition, the white list which the database 103 holds may further include a response action item for each entry of the white list for switching action such as whether to reserve the first bandwidth on the communication path or not when the first bandwidth is out of the range of the second bandwidth. In this case, for a certain entry, the operation may be, for example, such that not reserving the first bandwidth on the communication path, the determination result is always stored in a log. Note that for this certain entry, the operation may be such that the determination result may always be store as a log when the first bandwidth on the communication path is not reserved. This operation makes it possible to reserve the first bandwidth temporarily and store the determination result as a log or, for example, to discard the first bandwidth, depending on the operating state of the vehicle.

In addition, in the above embodiment, if the first bandwidth is out of the range of the second bandwidth, the network monitor 101 transmits to the source unit the result of reservation failure indicating that the first bandwidth has not been reserved. However, it is not essential to transmit the result.

(4) In the above embodiment, the network monitor 101 may make the vehicle 1 slow down and then stop as an action when the first bandwidth is out of the range of the second bandwidth. Alternatively, the network monitor 101 may stop the automated driving and cancel the ADAS function as an action in this case.

More specifically, the determiner 104 may further determine the operating state of the vehicle 1. In this case, the operation may be such that if the determiner 104 determines that the value of the first bandwidth is out of the range of the second bandwidth specified by the normal band value and the abnormality judgment value, and also the operating state of the vehicle 1 is a driving state, the network monitor 101 transmits to the vehicle an instruction to slow down and then stop the vehicle 1. This makes it possible to change the operating state of the vehicle depending on the determination result whether the first bandwidth is inappropriate and thus to prevent an impediment to the automated driving or the like which may lead to a serious accident.

In addition, if the determiner 104 determines that the value of the first bandwidth is out of the range of the second bandwidth specified by the normal band value and the abnormality judgment value, and the vehicle 1 is in the operating state where the automated driving function or the driving assistance function is in operation, the network monitor 101 may transmit to the vehicle 1 an instruction to stop the automated driving function or the driving assistance function. This makes it possible to change the operating state of the vehicle depending on the determination result whether the first bandwidth is inappropriate and thus to prevent an impediment to the automated driving or the like which may lead to a serious accident.

(5) Although in the above embodiment, the network monitor 101 transmits to the source unit the determination result of comparison with the white list which the database 103 holds, the present disclosure is not limited to this operation. The network monitor 101 may transmit the determination result to the cloud server 4 or a server on a network outside the in-vehicle network. The network monitor 101 may transmit the determination result to the IVI (in-vehicle Infotainment). The network monitor 101 may transmit the determination result to another vehicle via V2X (vehicle-to-everything). The network monitor 101 may transmit the determination result to components of the infrastructure, such as traffic signals and road signs, via V2i (vehicle-to-infrastructure).

(6) In the above embodiment, the database 103 holds a predetermined white list. Parameters written in the white list, such as the normal band value and the abnormality judgment value that specify the second bandwidth, may be determined based on the specification of the data communication. In other words, the parameters may be determined based on the second bandwidth that is considered to be normal when a service performs data communication based on the specification of each service. The method of determining the parameters is not limited to the one based on the specification of the data communication described above but may be based on learning. In addition, the parameters may be updated, after determined once, by giving feedback of results of trial operation of each type of vehicle. A conceivable update frequency is once every two weeks, for example.

(7) Although in the above embodiment, the database 103 uses the normal band value and the abnormality judgment value as parameters to specify the second bandwidth in the white list, the present disclosure is not limited to these parameters. For example, as illustrated in FIG. 6, the white list may include a list that defines the frequency per a certain time on a data communication type basis, or the white list may include the frequency per a certain time in the total which is the total number of times of data communication that passes through the communication path.

Figure 6:
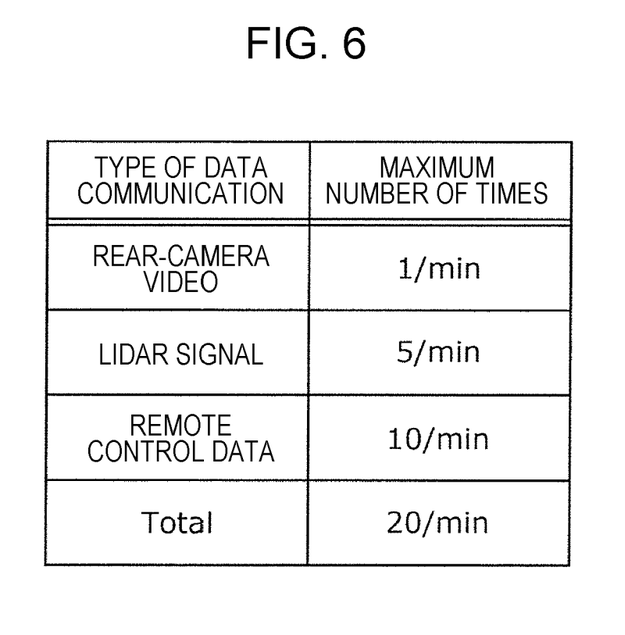
FIG. 6 is a diagram illustrating another example of a white list which the database according to the present disclosure holds.

Here, FIG. 6 is a diagram illustrating another example of a white list which the database 103 according to the present disclosure holds. Also, in the example illustrated in FIG. 6, the types of data communication used by the services are rear-camera video, a LIDAR signal, remote-control data, and "Total", which is the total number of times of data communication that passes through the communication path. For the rear-camera video, the maximum number of times is, for example, 1/min. For the LIDAR signal, the maximum number of times is, for example, 5/min. For the remote-control data, the maximum number of times is, for example, 10/min. For the "Total", the maximum number of times is, for example, 20/min. Note that since these values are examples, after using each service in a normal manner for a certain time, another value may be set from the increase/decrease in the amount of traffic during the certain time. Further, the user may set the maximum numbers of times to certain values.

This makes it possible to cope with an inappropriate request for reservation for a large first bandwidth even if the first bandwidth is within a normal range. Specifically, this make it possible to cope with a DDoS (distributed denial of service) attack which intentionally imposes an excessive load on the network resources.

(8) In the above embodiment, the type of data communication that the network monitor 101 handles using the database 103 may be stream IDs included in IEEE1722 frames, port numbers used in TCP/UDP, IP addresses, MAC addresses, or the like.

(9) Although in the description of the above embodiment, the in-vehicle network is Ethernet, the present disclosure is not limited to this technology. The in-vehicle network may be CAN, CAN-FD, LIN, or Flexray, or may be a combination of any of these.

In addition, although in the above embodiment, the present disclosure has been described as a cyber security measure for the in-vehicle network used in an automobile, the scope of application is not limited to this case. The present disclosure may be applied not only to automobiles but also mobility entities, such as construction machines, agricultural machines, ships, trains, airplanes and mobile vehicles. In other words, the present disclosure is also applicable to a cyber security measure for mobility networks and mobility network systems.

(10) Each device in the above embodiment is, specifically, a computer system including a microprocessor, ROM, RAM, hard disk unit, display unit, keyboard, mouse, and the like. The RAM or the hard disk unit stores a computer program. Each device achieves its function by the microprocessor operating according to the computer program. Here, the computer program includes combinations of multiple instruction codes which are instructions for the computer to achieve a predetermined function.

The present disclosure can be utilized for network monitors, network monitoring methods, and programs for a mobility network, in particular, for a network monitor disposed in a mobility network and a method and program for monitoring a network for contributing to the development of mobility entities, such as vehicles, aiming to secure safety.

What is claimed is:

1. A network monitor for a mobility network used in a mobility entity, the mobility network being formed by multiple electronic control units including a source unit, a destination unit, and one or more repeaters that form a communication path in the mobility network, each of the one or more repeaters including the network monitor, the network monitor comprising:
a processor; and
a memory including at least one set of instructions that, when executed by the processor, causes the processor to perform operations including:
receiving, from the source unit, an announcement for a bandwidth reservation, the announcement including a value of a first bandwidth requirement for the source unit to perform first data communication;
determining a determination result of whether to reserve the first bandwidth by comparing the value of the first bandwidth with a range of values of a second bandwidth for the first data communication specified in a white list, the white list being stored in a database and the range of values of the second bandwidth is specified according to a data communication type;
reserving the first bandwidth for performing the first data communication depending on the determination result; and
transmitting, to the source unit, a reservation status of the first bandwidth.

2. The network monitor according to claim 1, wherein the white list includes parameters according to the data communication type,
the parameters indicate a normal band value and an abnormality judgment value that specify the range of values of the second bandwidth, and
the abnormality judgment value indicates a range of variation from the normal band value.

3. The network monitor according to claim 2, wherein the determining includes
comparing the value of the first bandwidth with the parameters included in the white list, and
determining whether to reserve the first bandwidth depending on whether the value of the first bandwidth is included in the range of values of the second bandwidth specified by the normal band value and the abnormality judgment value.

4. The network monitor according to claim 3, wherein the determining includes storing data, in a memory as a log of the determination result, indicating whether the value of the first bandwidth is included in the range of values of the second bandwidth specified by the normal band value and the abnormality judgment value.

5. The network monitor according to claim 3, wherein when the value of the first bandwidth is determined to be included in the range of values of the second bandwidth specified by the normal band value and the abnormality judgment value, the first bandwidth is reserved for performing the first data communication in the reserving.

6. The network monitor according to claim 3, wherein when the value of the first bandwidth is determined to be out of the range of values of the second bandwidth specified by the normal band value and the abnormality judgment value, the first bandwidth is not reserved in the reserving.

7. The network monitor according to claim 3, wherein the determining further includes determining an operating state of the mobility entity,
the determination result includes the operating state of the mobility entity, and
when the operating state of the mobility entity is a driving state, the first bandwidth is reserved in the reserving even if the value of the first bandwidth is determined to be out of the range of values of the second bandwidth specified by the normal band value and the abnormality judgment value.

8. The network monitor according to claim 3, wherein the determining further includes determining an operating state of the mobility entity, and
when the value of the first bandwidth is determined to be out of the range of values of the second bandwidth specified by the normal band value and the abnormality judgment value, and the operating state of the mobility entity is determined to be a driving state, the network monitor transmits, to the mobility entity, an instruction to slow down and then stop the mobility entity.

9. The network monitor according to claim 3, wherein the determining further includes determining an operating state of the mobility entity, and
when the value of the first bandwidth is determined out of the range of the second bandwidth specified by the normal band value and the abnormality judgment value, and the operating state of the mobility entity is determined to be a state where an automated driving function or a driving assistance function is in operation, the network monitor transmits, to the mobility entity, an instruction to stop the automated driving function or to stop the driving assistance function.

10. The network monitor according to claim 1, wherein the transmitting includes transmitting the determination result in the determining to the source unit.

11. The network monitor according to claim 1, wherein in the determining, when the first bandwidth is determined to be reserved, the network monitor forwards the value of the first bandwidth to a next repeater on the communication path or the destination unit.

12. The network monitor according to claim 1, wherein the first bandwidth is reserved via Ethernet AVB/TSN.

13. A network monitoring method for a mobility network used in a mobility entity, the mobility network being formed by multiple electronic control units including a source unit, a destination unit, and one or more repeaters that form a communication path in the mobility network,
the network monitoring method being executed in each of the one or more repeaters,
the network monitoring method comprising:
receiving, from the source unit, an announcement for a bandwidth reservation, the announcement including a value of a first bandwidth requirement for the source unit to perform first data communication;
determining a determination result of whether to reserve the first bandwidth by comparing the value of the first bandwidth with a range of values of a second bandwidth for the first data communication specified in a white list, the white list being stored in a database and the range of values of the second bandwidth is specified according to a data communication type;

reserving the first bandwidth for performing the first data communication depending on the determination result; and transmitting, to the source unit, a reservation status of the first bandwidth.

14. A non-transitory computer-readable recording medium storing a program for network monitoring in a mobility network used in a mobility entity, the mobility network being formed by multiple electronic control units including a source unit, a destination unit, and one or more repeaters that form a communication path in the mobility network, the program being executed in each of the one or more repeaters, the program, when executed by a processor, causing the processor to execute a method comprising:

receiving, from the source unit, an announcement for a bandwidth reservation, the announcement including a value of a first bandwidth requirement for the source unit to perform first data communication;

determining a determination result of whether to reserve the first bandwidth by comparing the value of the first bandwidth with a range of values of a second bandwidth for the first data communication specified in a white list, the white list being stored in a database and the range of values of the second bandwidth is specified according to a data communication type;

reserving the first bandwidth for performing the first data communication according to the determination result; and transmitting, to the source unit, a reservation status of the first bandwidth.

* * * * *